US00RE50656E

(19) United States
(12) Reissued Patent
Jeong et al.

(10) Patent Number: US RE50,656 E
(45) Date of Reissued Patent: *Nov. 4, 2025

(54) AID REASSIGNMENT METHOD, AND APPARATUS FOR PERFORMING SAID AID REASSIGNMENT METHOD

(71) Applicant: GOLDEN EYE TECHNOLOGIES LLC, Round Rock, TX (US)

(72) Inventors: Yang Seok Jeong, Yongin-si (KR); Joo Young Kim, Seoul (KR)

(73) Assignee: GOLDEN EYE TECHNOLOGIES LLC, Round Rock, TX (US)

( * ) Notice: This patent is subject to a terminal disclaimer.

(21) Appl. No.: 17/325,985

(22) Filed: May 20, 2021

Related U.S. Patent Documents

Reissue of:
(64) Patent No.: 10,299,156
Issued: May 21, 2019
Appl. No.: 15/875,075
Filed: Jan. 19, 2018

U.S. Applications:
(63) Continuation of application No. 14/411,302, filed as application No. PCT/KR2013/005756 on Jun. 28, 2013, now Pat. No. 9,913,162.

(30) Foreign Application Priority Data

Jun. 28, 2012 (KR) ..... 10-2012-0069980

(51) Int. Cl.
*H04W 28/02* (2009.01)
*H04W 8/22* (2009.01)
(Continued)

(52) U.S. Cl.
CPC ..... *H04W 28/0221* (2013.01); *H04W 8/22* (2013.01); *H04W 28/0215* (2013.01);
(Continued)

(58) Field of Classification Search
CPC ..... H04W 28/0221; H04W 28/0215; H04W 8/22; H04W 88/02; H04W 88/08; Y02D 30/70
See application file for complete search history.

(56) References Cited

U.S. PATENT DOCUMENTS 7,933,635 B2 4/2011 Oh et al.
7,991,409 B2 8/2011 Qi et al.
(Continued)

FOREIGN PATENT DOCUMENTS

CN 102821466 A * 12/2012
JP 2004-187002 7/2004
(Continued)

OTHER PUBLICATIONS

Kim et al., "AID Reassignment Protocol," IEEE 802.11-12/0364r0 (Mar. 12, 2012).
(Continued)

*Primary Examiner* — Charles R Craver
(74) *Attorney, Agent, or Firm* — VOLPE KOENIG

(57) ABSTRACT

Disclosed are an AID reassignment method capable of optimally operating a wireless LAN system, and an apparatus for performing the AID reassignment method. The method comprises the steps of: generating a reconnection request frame for an AID reassignment request; transmitting the generated reconnection request frame to the currently associated access point; and receiving a reconnection response frame including AID reassignment information from the access point. Thus, the AID of the currently associated terminal can be dynamically reassigned according to a change in the characteristics of the terminal, thus operating a wireless LAN system in an optimum manner.

24 Claims, 9 Drawing Sheets

(51) Int. Cl.
*H04W 48/14* (2009.01)
*H04W 88/02* (2009.01)
*H04W 88/08* (2009.01)

(52) U.S. Cl.
CPC ..... *H04W 48/14* (2013.01); *H04W 88/02* (2013.01); *H04W 88/08* (2013.01); *Y02D 30/70* (2020.08)

(56) References Cited

U.S. PATENT DOCUMENTS 8,553,605 B2 * 10/2013 Cho ..... H04W 8/186 370/312
8,693,380 B2 4/2014 He et al.
8,780,871 B2 * 7/2014 Grandhi ..... H04W 48/12 709/227
9,137,823 B1 * 9/2015 Liu ..... H04W 74/006
9,398,446 B2 * 7/2016 Jeong ..... H04L 61/3015
9,538,368 B2 * 1/2017 Seok ..... H04W 8/26
9,622,073 B2 * 4/2017 Jeong ..... H04L 61/3015
9,974,003 B2 * 5/2018 Seok ..... H04W 48/08
10,045,205 B2 * 8/2018 Jeong ..... H04W 8/26
10,595,196 B2 * 3/2020 Jeong ..... H04W 48/10
2005/0053043 A1 * 3/2005 Rudolf ..... H04W 36/0072 370/347
2006/0154662 A1 7/2006 Kil et al.
2006/0233128 A1 10/2006 Sood et al.
2007/0025349 A1 2/2007 Bajic
2007/0060128 A1 3/2007 Kil
2008/0170519 A1 7/2008 Sim et al.
2008/0170520 A1 7/2008 Sim et al.
2009/0067358 A1 * 3/2009 Fischer ..... H04L 12/1868 370/312
2009/0287812 A1 11/2009 Weber et al.
2010/0067486 A1 3/2010 Masuda
2012/0195296 A1 * 8/2012 Adachi ..... H04W 72/51 370/338
2013/0121242 A1 * 5/2013 Pani ..... H04L 69/03 370/328
2013/0142184 A1 * 6/2013 Wang ..... H04L 1/0065 370/338
2013/0163495 A1 6/2013 Lim et al.
2013/0173924 A1 7/2013 Kim et al.
2013/0329658 A1 * 12/2013 Liu ..... H04W 74/04 370/329
2013/0336245 A1 * 12/2013 Fischer ..... H04W 74/006 370/329
2014/0064173 A1 * 3/2014 Meylan ..... H04W 52/0216 370/311
2014/0133393 A1 * 5/2014 Ghosh ..... H04W 8/26 370/328
2015/0009878 A1 * 1/2015 Kim ..... H04W 52/0219 370/311
2015/0156672 A1 * 6/2015 Seok ..... H04L 5/0044 370/338
2015/0215867 A1 * 7/2015 Choi ..... H04W 72/0413 370/311
2016/0021680 A1 * 1/2016 Choi ..... H04W 74/002 370/329
2016/0088665 A1 * 3/2016 Kim ..... H04W 76/14 370/329
2017/0118696 A1 * 4/2017 Seok ..... H04W 28/06

FOREIGN PATENT DOCUMENTS

JP 2004187002 A 7/2004
JP 2010-068488 3/2010
JP 2010-068488 A 3/2010
KR 10-2005-0067897 A 7/2005
KR 2005-0067897 7/2005
KR 2008-0041530 5/2008
KR 1020080041530 A 5/2008
KR 10-2010-0067793 A 6/2010
KR 2010-0067793 6/2010
WO 2008/088114 7/2008
WO 2008088114 A1 7/2008
WO 2013/077690 5/2013
WO 2013077690 A1 5/2013
WO WO-2022028610 A1 * 2/2022 ..... H04W 72/23

OTHER PUBLICATIONS

Kim et al., "AID Reassignment Protocol," IEEE 802.11-12/0364r1 (Mar. 14, 2012).
Kim et al., "AID Reassignment Protocol," IEEE 802.11-12/0364r2 (May 14, 2012).
Kim et al., "AID Reassignment Protocol," IEEE 802.11-12/0364r3 (May 14, 2012).
Yang et al., "AID reassignment for TIM and non-TIM modes switching," IEEE 802.11-12/891r0 (Jul. 13, 2012).

* cited by examiner

FIG. 6

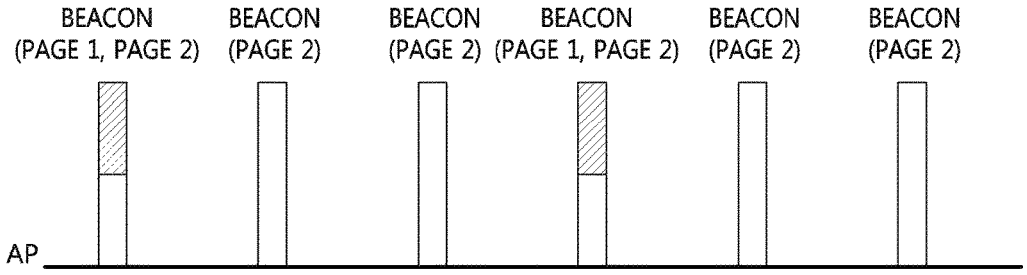

FIG. 7

| ORDER | INFORMATION | NOTES |
|---|---|---|
| 1 | Capability | |
| 2 | Listen Interval | |
| 3 | Current AP address | |
| 4 | SSID | |
| 5 | Supported rates | |
| 6 | Extended Supported Rates | The Extended Supported Rates element is present if there are more than eight supported rates, and it is optional otherwise. |
| 7 | Power Capability | The Power capability element is present if dot11 spectrumManagementRequired is true or dot11 RadioMeasurementActivated is true. |
| 8 | Supported Channels | The Supported Channel element is present if dot11 spectrumManagementRequired is true and dot11 ExtendedChannelSwitchActivated is false. |
| 9 | RSN | The RSNE is present only if dot11 RSNAActivated is true. |
| 10 | Qos Capability | The Qos Capability element is present if dot11 QosOption-Implemented is true. |
| 11 | RM Enabled Capabilities | RM Enabled Capabilities element is present if dot11RadioMeasurementActivated is true. |
| 12 | Mobility Domain | The MDE is present in a Reassociation Request frame if dot11FastBSSTransitionActivated is true and the frame is being sent to an AP that advertised its FT Capability in the MDE in its Beacon or Probe Response frame (i.e, AP also has dot11FastBSSTransitionActivated is true). |

| ORDER | INFORMATION | NOTES |
|---|---|---|
| 1 | Capability | |
| 2 | Listen Interval | |
| 3 | Current AP address | |
| 4 | SSID | |
| 5 | Supported rates | |
| 6 | AID Reassignment Request | |
| 7 | Service Type | |

FIG. 10

| | ELEMENT ID | LENGTH | AID REASSIGNMENT CAUSE |
|---|---|---|---|
| OCTETS: | 1 | 1 | 1 |

FIG. 11

| | AID REASSIGNMENT CAUSE | | | |
|---|---|---|---|---|
| | TBD | LISTEN INTERVAL CHANGE | LOW POWER MODE | SERVICE TYPE CHANGE |
| BITS: | 7 ~ 3 | 2 | 1 | 0 |

FIG. 12

| ELEMENT ID | LENGTH | SERVICE TYPE |
|---|---|---|
| 1 | 1 | 1 |

FIG. 14
| ORDER | INFORMATION | NOTES |
|---|---|---|
| 1 | Capability | |
| 2 | Status code | |
| 3 | AID | |
| 4 | Supported rates | |
FIG. 15
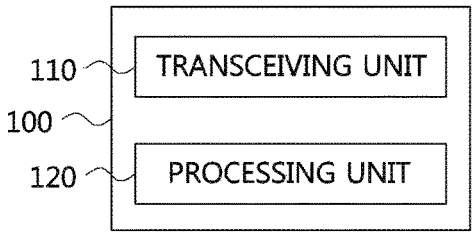
FIG. 16
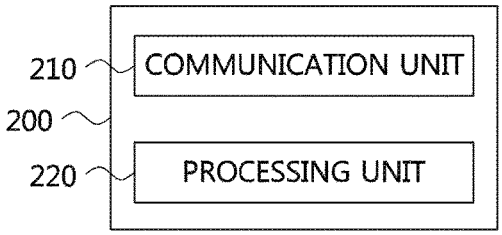

AID REASSIGNMENT METHOD, AND APPARATUS FOR PERFORMING SAID AID REASSIGNMENT METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS AND CLAIM FOR PRIORITY

This application is a continuation application of U.S. patent application Ser. No. 14/411,302, filed on Dec. 24, 2014, which is a National Stage of International Patent Application No. PCT/KR2013/005756, filed on Jun. 28, 2013, which claims priority from Korean Patent Application No. 10-2012-0069980, filed on Jun. 28, 2012 in the Korean Intellectual Property Office (KIPO), the contents of all of which are incorporated herein by reference in their entirety.

BACKGROUND

1. Technical Field

Example embodiments of the present invention relate in general to a wireless communication technology and more specifically to a method of reassigning an association ID (AID) and an apparatus for performing the same, which allow an optimal operation of a wireless local area network (WLAN) system according to a change in characteristics of a terminal.

2. Related Art

Various wireless communication techniques are being developed along with the recent development of an information communication technology. In particular, wireless local area network (WLAN) is a technology that can provide a wireless connection to the Internet in a limited service area such as a home or office building using portable terminals, for example, a personal digital assistant (PDA), a laptop computer, and a portable multimedia player (PMP) based on a wireless frequency technology.

Standards for WLAN technology is developed and standardized by IEEE 802.11 working group (WG) in the Institute of Electrical and Electronics Engineering (IEEE) 802.11. IEEE 802.11a provides a maximum PHY data rate of 54 Mbps using 5 GHz unlicensed band. IEEE 802.11b provides a maximum PHY data rate of 11 Mbps by using direct sequence spread spectrum (DSSS) in 2.4 GHz band. IEEE 802.11g supports a maximum PHY data rate of 54 Mbps by using orthogonal frequency division multiplexing (OFDM) in 2.4 GHz band. IEEE 802.11n provides a maximum PHY data rate of 300 Mbps using 40 MHz bandwidth with two spatial streams and a maximum PHY data rate of 600 Mbps using 40 MHz bandwidth with four spatial streams.

Along with the wide deployment of WLAN and the diversification of applications using WLAN, new WLAN techniques are increasingly needed to support higher throughput than IEEE 802.11n. Very high throughput (VHT) WLAN is one of 802.11 WLAN techniques, which is proposed to support a data processing rate of 1 Gbps or more. In particular, IEEE 802.11ac is developed as a standard for providing a very high throughput on the 5 GHz band, and IEEE 802.11ad is developed as a standard for providing a very high throughput on the 60 GHz band.

In systems based on the WLAN techniques, an access point assigns individual association IDs (AIDs) to terminals in the order in which the terminals are associated with the access point. However, when 6,000 or more terminals are required to be supported (for example, 802.11ah), the access point groups terminals having similar characteristics and assigns AIDs to the grouped terminals to perform effective management.

That is, the access point may adjust a network traffic amount and a simultaneous channel access amount by grouping a plurality of terminal in units of pages and setting traffic indication map (TIM) elements at different periods.

When the traffic is overloaded at a TIM setting period, AIDs are needed to be reassigned to change some of terminals in a specific page group to another page group. In addition, when a service type or a traffic characteristic of a terminal is changed, the AID is needed to be correspondingly reassigned.

In order to the above-described need, research is being conducted on an AID assignment request, but a detailed method for AID assignment is not yet revealed.

SUMMARY

Accordingly, example embodiments of the present invention are provided to substantially obviate one or more problems due to limitations and disadvantages of the related art.

Example embodiments of the present invention provide a method of reassigning an association ID (AID), which may optimally operate a wireless local area network (WLAN) system according to a change in characteristics of a terminal.

Example embodiments of the present invention also provide an apparatus for performing the AID reassignment method.

In some example embodiments, a method of reassigning an association ID (AID), which is performed by a terminal, the method includes generating a reassociation request frame for an AID reassignment request, transmitting the generated reassociation request frame to a currently associated access point, and receiving a reassociation response frame including AID reassignment information from the access point.

The generating of the reassociation request frame for the AID reassignment request may include generating the reassociation request frame including an AID reassignment request element.

The AID reassignment request element may include an AID reassignment cause field.

The AID reassignment cause field may include at least one of service type change information, low power mode information, listen interval change information, traffic pattern change information, and remaining battery information.

The reassociation request frame may further include a service type element, and when the AID reassignment cause field includes the service type change information, the service type element may include a service type that is changed based on the service type change information.

The method may further include determining whether the AID reassignment is needed.

The determining of whether the AID reassignment is needed may include determining whether the AID reassignment is needed based on at least one of traffic pattern information, battery information, and service type information of the terminal.

In other example embodiments, a method of reassigning an association ID (AID), which is performed by an access point, the method includes receiving a reassociation request frame from a currently associated terminal, reassigning an AID of the terminal based on the reassociation request frame, and transmitting a reassociation response frame including the reassigned AID to the terminal.

The receiving of the reassociation request frame from the currently associated terminal may include receiving the reassociation request frame including an AID reassignment request element from the currently associated terminal.

The AID reassignment request element may include an AID reassignment cause field.

The reassigning of the AID of the terminal based on the reassociation request frame may include checking a current AP address, a service set ID (SSID), and the AID reassignment request element included in the reassociation request frame and reassigning the AID of the terminal based on the AID reassignment cause included in the AID reassignment request element when the reassociation request frame is checked to be the AID reassignment request.

The reassociation response frame may include at least one of AID reassignment success information, AID reassignment failure information, and information on the reassigned AID.

In still other example embodiments, a terminal includes a transceiving unit and a processing unit configured to generate a reassociation request frame for an association ID (AID) reassignment request; transmit the generated reassociation request frame to a currently associated access point; and receive a reassociation response frame including AID reassignment information from the access point.

The processing unit may generate a reassociation request frame including an AID reassignment request element.

The AID reassignment request element may include an AID reassignment cause field.

The AID reassignment cause field may include at least one of service type change information, low power mode information, listen interval change information, traffic pattern change information, and remaining battery information.

The processing unit may determine whether the AID reassignment is needed based on at least one of the traffic pattern information, battery information, and service type information of the terminal.

In yet still other example embodiments, an access point includes a communication unit and a processing unit configured to reassign an association ID (AID) of a terminal based on a reassociation request frame including an AID reassignment request element received from the terminal through the communication unit and transmit a reassociation response frame including the reassigned AID to the terminal through the communication unit.

The AID reassignment request element may include an AID reassignment cause field.

The processing unit may check a current AP address, a service set ID (SSID), and the AID reassignment request element included in the reassociation request frame and, when the reassociation request frame is checked to be an AID reassignment request, reassign the AID of the terminal based on the AID reassignment cause included in the AID reassignment request element.

BRIEF DESCRIPTION OF DRAWINGS

Example embodiments of the present invention will become more apparent by describing in detail example embodiments of the present invention with reference to the accompanying drawings, in which:

FIG. 6 is a conceptual view showing a TIM element that is set at different periods from a grouped page;

FIG. 7 is a conceptual view showing a reassociation request frame structure;

FIG. 10 is a conceptual view showing an AID reassignment request element format according to an embodiment of the present invention;

FIG. 11 is a conceptual view showing an AID reassignment cause field according to an embodiment of the present invention;

FIG. 12 is a conceptual view showing a service type element format according to an embodiment of the present invention;

FIG. 14 is a conceptual view showing a reassignment response frame structure according to an embodiment of the present invention;

FIG. 15 is a view showing a configuration of a terminal that performs an AID reassignment method according to an embodiment of the present invention; and FIG. 16 is a view showing a configuration of a terminal that performs an AID reassignment method according to an embodiment of the present invention.

DESCRIPTION OF EXAMPLE EMBODIMENTS

Figure 1:
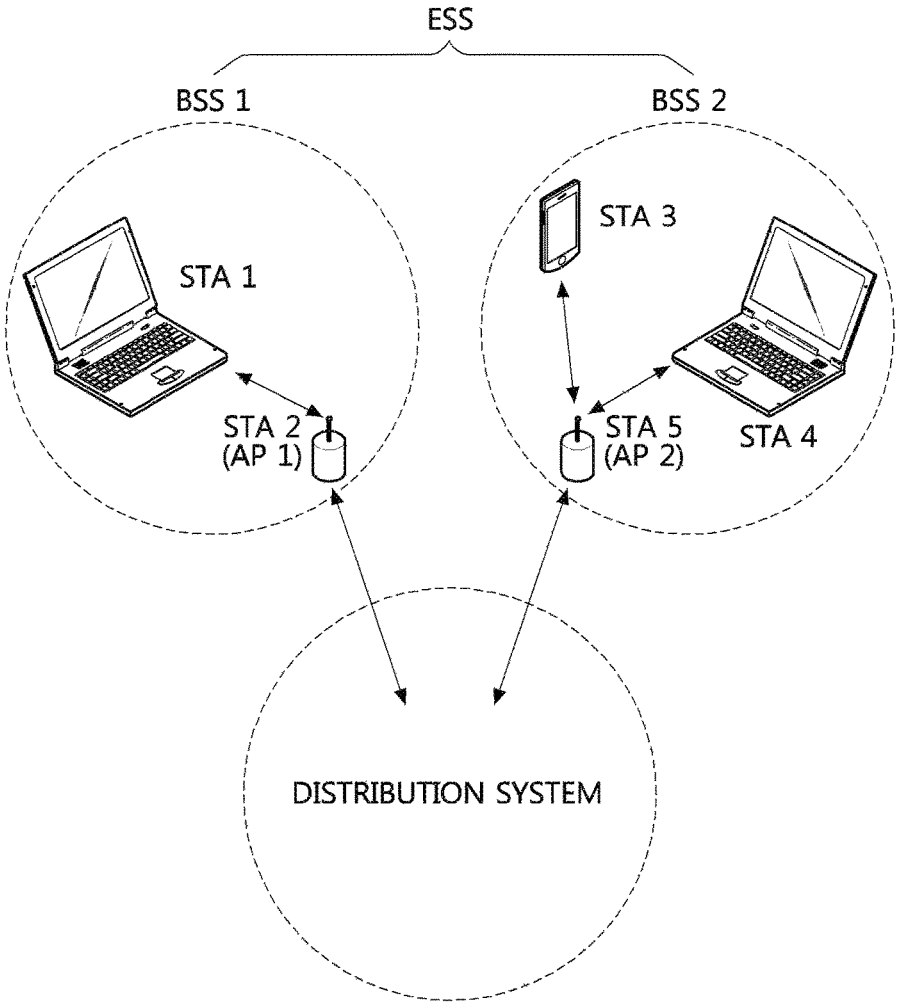
FIG. 1 is a conceptual view showing a configuration of an IEEE 802.11 wireless local area network (WLAN) system according to an embodiment of the present invention.

Since the present invention may be variously modified and have several exemplary embodiments, specific exemplary embodiments will be shown in the accompanying drawings and be described in detail in a detailed description.

However, it should be understood that the particular embodiments are not intended to limit the present disclosure to specific forms, but rather the present disclosure is meant to cover all modification, similarities, and alternatives which are included in the spirit and scope of the present disclosure.

It will be understood that, although the terms first, second, etc. may be used herein to describe various elements, these elements should not be limited by these terms. These terms are only used to distinguish one element from another. For example, a first component may be designated as a second component, and similarly, the second component may be designated as the second component. The use of the term of 'and/or' means that combination of a plurality of related and described items or one items among a plurality of related and described items is included.

When it is mentioned that a certain component is "coupled with" or "connected with" another component, it may be understood that another component can exist between the two components although the component can be directly coupled or connected with the another component. Meanwhile, when it is mentioned that a certain component is "directly coupled with" or "directly connected with" another component, it has to be understood that another component does not exist between the two components.

In the following description, the technical terms are used only for explaining a specific exemplary embodiment while not limiting the present disclosure. Singular forms used herein are intended to include plural forms unless explicitly indicated otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present invention will be described in detail with reference to the accompanying drawings. In describing the invention, in order to facilitate the entire understanding of the invention, like numbers refer to like elements throughout the description of the figures and the repetitive description thereof will be omitted.

Throughout this specification, a station (hereinafter also referred to as an STA) is any functional medium including a medium access control (MAC) and wireless-medium physical layer (PHY) interface conforming to the IEEE 802.11 standard. The STA may include an access point (AP) STA and non-AP STA. The AP STA may be simply referred to as an access point (hereinafter also referred to as an AP), and the non-AP STA is simply referred to as a terminal.

The STA includes a processor and a transceiver, and may further include a user interface, a display device, and so on. The processor is a functional unit devised to generate a frame to be transmitted through a wireless network or to process a frame received through the wireless network, and performs various functions to control the STA. The transceiver is functionally connected to the processor and is a functional unit devised to transmit and receive a frame for the STA through the wireless network.

The AP may be called a convergence controller, a base station (BS), a node-B, an eNode0B, a base transceiver system, or a site controller, and may include some or all of functions thereof.

The terminal may be called a user equipment (UE), a mobile station (MS), a user terminal (UT), a wireless terminal, an access terminal (AT), a subscriber unit, a subscriber station (SS), a wireless device, a wireless communication device, a wireless transmit/receive unit (WTRU), a mobile node, a mobile, or the like. Examples of the terminal may include, but are not limited to, a cellular phone, a smart phone with a wireless communication function, a personal digital assistant (PDA) with a wireless communication function, a wireless modem, a portable computer with a wireless communication function, an imaging apparatus such as a digital camera with a wireless communication function, a gaming apparatus with a wireless communication function, a home appliance for storing and playing music files with a wireless communication function, an Internet home appliance capable of wireless Internet connection and browsing as well as portable units or terminals incorporating combinations of the functions.

FIG. 1 is a conceptual view showing a configuration of an IEEE 802.11 WLAN system according to an embodiment of the present invention.

Referring to FIG. 1, the IEEE 802.11 WLAN system includes at least one basic service set (BSS). The BBS denotes a set of stations STA 1, STA 2 (AP 1), STA 3, STA 4, STA 5 (AP 2) that may be successfully synchronized to communicate with one another, but does not denote a certain region.

The BBS may be classified into an infrastructure BSS and an independent BSS (IBSS). BBS 1 and BBS 2 denote the infrastructure BSS. BBS 1 may include a terminal STA 1, an access point STA 2 (AP 1) that provides a distribution service, and a distribution system (DS) that connects a plurality of access points STA 2 (AP 1) and STA 5 (AP 2). In BSS 1, the access point STA 2 (AP 1) manages the terminal STA 1.

BBS 2 may include the terminals STA 3 and STA 4, an access point STA 5 (AP 2) that provides a distribution service, and a distribution system that connects the plurality of access points STA 2 (AP 1) and STA 5 (AP 2). In BSS 2, the access point STA 5 (AP 2) manages the terminals STA 3 and STA 4.

The independent BSS (IBSS) is a BSS that operates in an ad-hoc mode. Since the IBSS does not include an access point, there is no centralized management entity for performing a central management function. That is, in the IBSS, terminals are managed in a distributed manner. The IBSS is a self-contained network, in which all terminals may be mobile terminals and may be disallowed to access the distribution system (DS).

The access points STA 2 (AP 1) and STA 5 (AP 2) provide a connection to the DS through a wireless medium for the associated terminals STA 1, STA 3 and STA 4. In BSS 1 or BSS 2, generally, a communication between the terminals STA 1, STA 3, and STA 4 is made through the access points STA 2 (AP 1) and STA 5 (AP 2). However, when a direct link is established, a direct communication between the terminals STA 1, STA 3, and STA 4 is enabled.

A plurality of infrastructure BBSs may be interconnected through the DS. The plurality of BBSs connected to each other through the DS is called an extended service set (ESS). STAs included in the ESS may communicate with each other, and within the same ESS, a terminal may move from one BSS to another BSS while communicating in a seamless manner.

The DS is a mechanism in which one AP communicates with another AP. By using the DS, an AP may transmit a frame to terminals that is associated with a BSS managed by the AP, or transmit a frame to a terminal that has moved to another BSS. In addition, the AP may transmit and receive a frame to and from an external network such as a wired network. The DS is not necessarily a network and has no limitation in its form as long as a predetermined distribution service specified in the IEEE 802.11 standard can be provided. For example, the DS may be a wireless network such as a mesh network, or may be a physical structure for interconnecting APs.

An AID reassignment method according to an embodiment of the present invention, which will be described below, may be applied to the above IEEE 802.11 WLAN system and also various networks such as a wireless personal area network (WPAN), a wireless body area network (WBAN), and so on.

Figure 2:
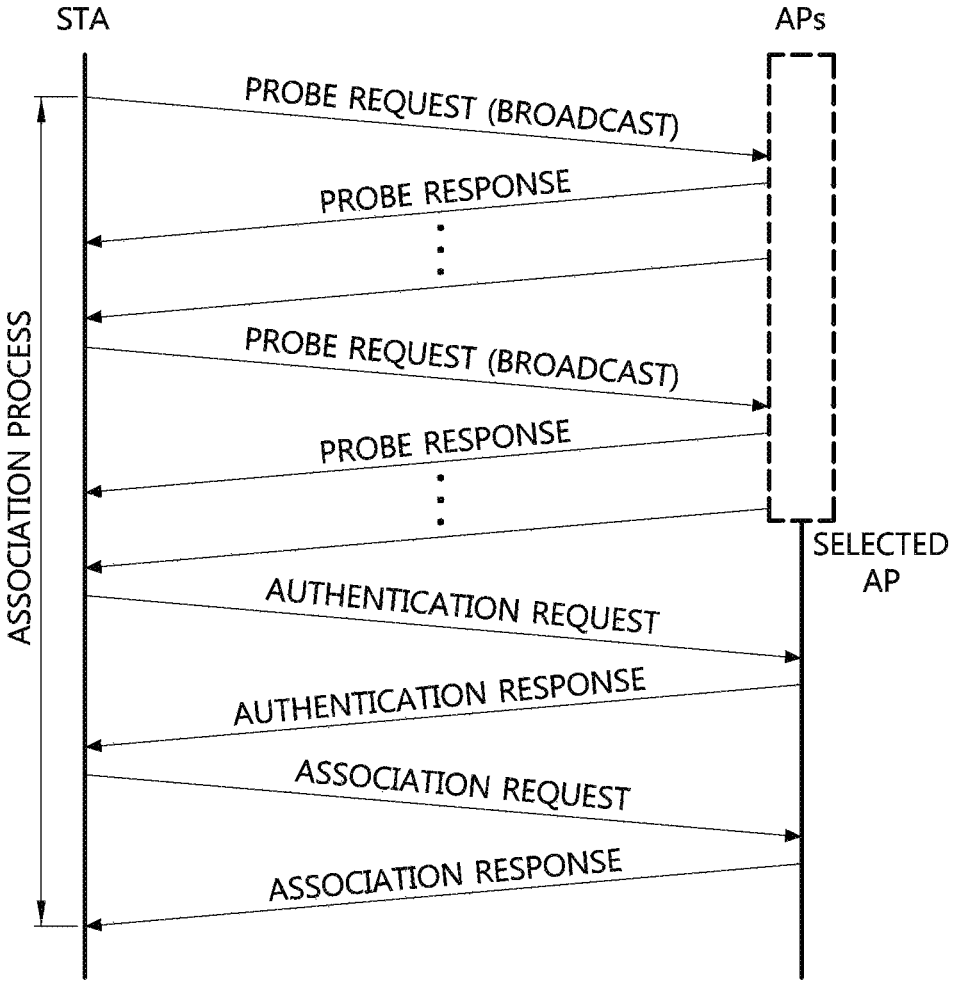
FIG. 2 is a conceptual view showing an association process for data transmission in a WLAN system.

FIG. 2 is a conceptual view showing an association process for data transmission in a WLAN system.

In order for a terminal STA to transmit and receive data in an infrastructure BSS, first, the terminal STA should be associated with an AP.

Referring to FIG. 2, the association process of the terminal STA in the infrastructure BSS may include: 1) probe step of probing an AP, 2) authentication step of authenticating the probed AP, and 3) association step of associating with the authenticated AP.

First, the terminal STA may probe neighboring APs through the probe process. The probe process includes a passive scanning method and an active scanning method. The passive scanning method may be performed by overhearing beacons that are transmitted by the neighboring APs. On the other hand, the active scanning method may be performed by broadcasting a probe request frame. Upon receiving the probe request frame, the AP may transmit a probe response frame corresponding to the probe request frame to the terminal STA. The terminal STA may check the presence of the neighboring APs by receiving the probe response frame.

Subsequently, the terminal STA performs authentication with the probed APs, and may perform the authentication with the plurality of APs. An authentication algorithm conforming to the IEEE 802.11 standard includes an open system algorithm that exchanges two authentication frames and a shared key algorithm that exchanges four authentication frames. Through a process of exchanging the authentication request frame and the authentication response frame based on the authentication algorithm, the terminal STA may perform authentication with the AP.

Last, the terminal STA selects one AP from among the authenticated plurality of APs and performs an association process with the selected AP. That is, the terminal STA transmits an association request frame to the selected AP. Upon receiving the association request frame, the AP transmits the terminal STA to an association response frame corresponding to the association request frame. As such, through the process of exchanging the association request frame and the association response frame, the terminal STA may perform the association process with the AP.

Figure 3:
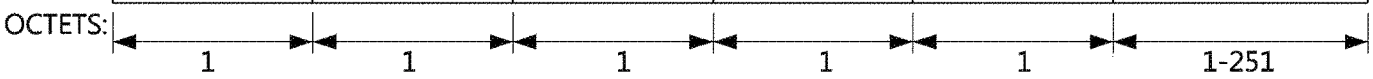
FIG. 3 is a conceptual view showing a TIM element format.

FIG. 3 is a block diagram showing an element of a traffic indication map (TIM) included in a beacon according to an embodiment of the present invention.

In the IEEE 802.11 WLAN system, when there is data to be transmitted to the terminal, the AP notifies the terminal that there is data to be transmitted using a TIM in a beacon frame that is periodically transmitted.

Referring to FIG. 3, the TIM includes an element ID field, a length field, a delivery traffic indication message (DTIM) count field, a DTIM period field, a bitmap control field, and a partial virtual bitmap field.

The length field indicates a length of an information field. The DTIM count field indicates the number of beacons before the DTIM. When a DTIM count is 0, a current TIM is the DTIM. The DTIM count field is composed of 1 octet. The DTIM period field indicates the number of beacon intervals between consecutive DTIMs. If all TIMs are the DTIMs, a value of the DTIM period field is 1. The DTIM period field is composed of 1 octet.

The bitmap control field is composed of 1 octet, and a bit number 0 of the bitmap control field denotes a traffic indicator bit that is associated with an association ID (AID) 0. When the bit is set as 1 and the value of the DTIM count field is 0, it can be seen that at least one multicast or broadcast frame is buffered in the AP. The remaining 7 bits of the bitmap control field form a bitmap offset.

Since the length field of the TIM element format is 1 octet, the partial virtual bitmap may have up to 251 octets, which may represent a total of 2,007 (8×251−1) terminals.

In addition, each bit of the partial virtual bitmap field corresponds to a traffic that is buffered for a specific terminal. In a case in which an AID of any terminal is N, a bit number N of the partial virtual bitmap field is set as 0 when there is no buffered traffic and the bit number N of the partial virtual bitmap field is set as 1 when there is buffered traffic.

Figure 4:
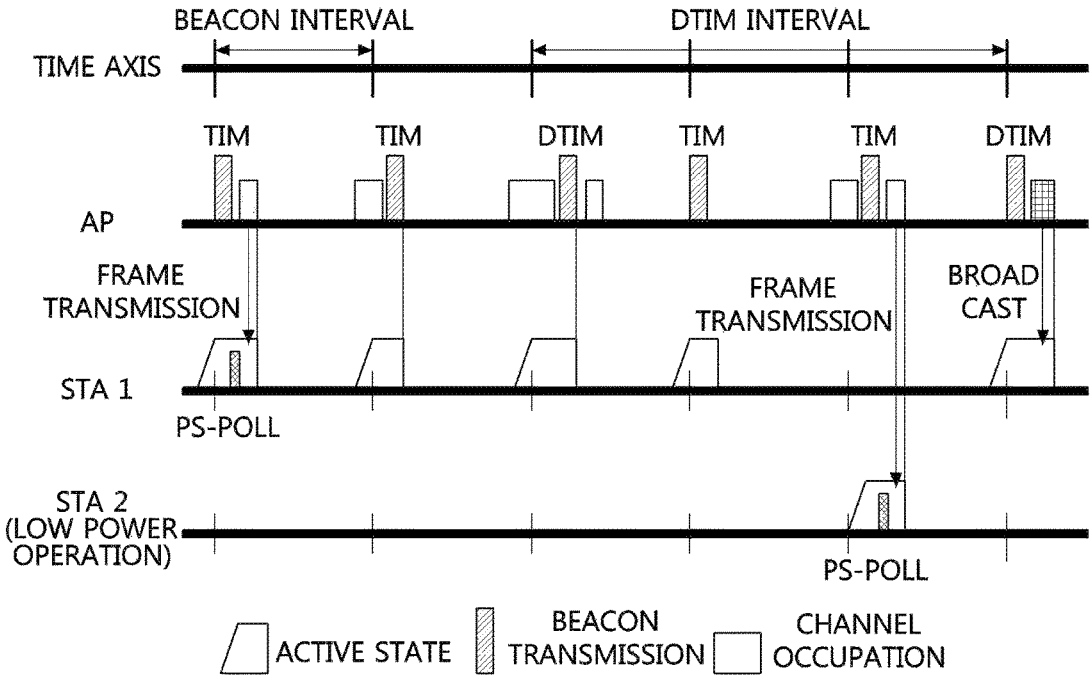
FIG. 4 is a conceptual view showing a mechanism of a power save mode in a WLAN system.

FIG. 4 is a conceptual view showing a data transmission process of an access point according to an embodiment of the present invention.

Referring to FIG. 4, the AP broadcasts a beacon periodically and may broadcast a beacon including the DTIM at every 3 beacon intervals. The terminals STA 1 and STA2 periodically wake up from a power save mode (PSM) and receive the beacon, and check the TIM or DTIM included in the beacon to determine whether the data to be transmitted to the terminals is buffered in the AP. In this case, when there is the buffered data, the terminals STA 1 and STA 2 maintain awake and receive the data from the AP. When there is no buffered data, the terminals STA 1 and STA 2 return to the PSM (that is, a doze state).

That is, when a bit in the TIM corresponding to an AID of the terminal STA 1 or STA 2 is set as 1, the terminal STA 1 or STA 2 transmits, to the AP, a power save (PS)-Poll frame (or a trigger frame) that informs the AP that the terminal STA is awake and ready to receive data. The AP may determine that the terminal STA 1 or STA 2 is ready to receive the data by receiving the PS-Poll frame and then may transmit the data or an acknowledgement (ACK) to the terminal STA 1 or STA 2. When the AP transmits the ACK to the terminal STA 1 or STA 2, the AP transmits data to the terminal STA 1 or STA 2 at an appropriate time. On the other hand, when the bit in the TIM corresponding to the AID of the terminal STA 1 or STA 2 is set as 0, the terminal STA 1 or STA 2 returns to the PSM.

Figure 5:
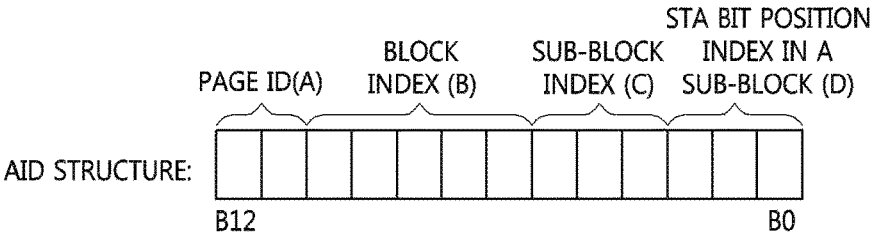
FIG. 5 is a conceptual view showing a hierarchical AID structure.

FIG. 5 is a conceptual view showing a hierarchical AID structure, FIG. 6 is a conceptual view showing a TIM element that is set at different periods from a grouped page, and FIG. 7 is a conceptual view showing a reassociation request frame structure.

Referring to FIG. 5, the hierarchical AID structure may include a page ID, a block index, and an STA bit position index in a sub-block.

Through the above-described hierarchical AID structure, 2,007 terminals or more may be represented and managed as a TIM bitmap.

Referring to FIG. 6, the AP groups a plurality of terminals in units of pages to set a TIM element at different periods according to characteristics of a terminal.

For example, if terminals belonging to Page 1 have a small amount of traffic, the TIM element is set to the DTIM beacon for the terminals belonging to Page 1. In addition, if terminals belonging to Page 2 have a large amount of traffic, the TIM element may be set to every beacon for the terminals belong to Page 2, thus simultaneously controlling the amount of traffic and the amount of channel connection.

However, the AID of the terminal is needed to be reassigned when a service type of the terminal that is grouped in units of pages is changed (for example, the terminal has a different traffic pattern), when a remaining battery life of the terminal is changed, or when a listen interval is needed to be changed.

Typically, the terminal uses the reassociation request frame as shown in FIG. 7 to reassign an AID of the terminal. However, generally, the reassociation request frame shown in FIG. 7 is a frame that is transmitted by the terminal to connect to an AP of a different basic service set (BSS) in an extended service set (ESS), That is, when the terminal requests an AID reassociation to the currently associated access point, the terminal does not have to transmit a reassociation request frame including all information elements as shown in FIG. 7.

Figures 8, 9:
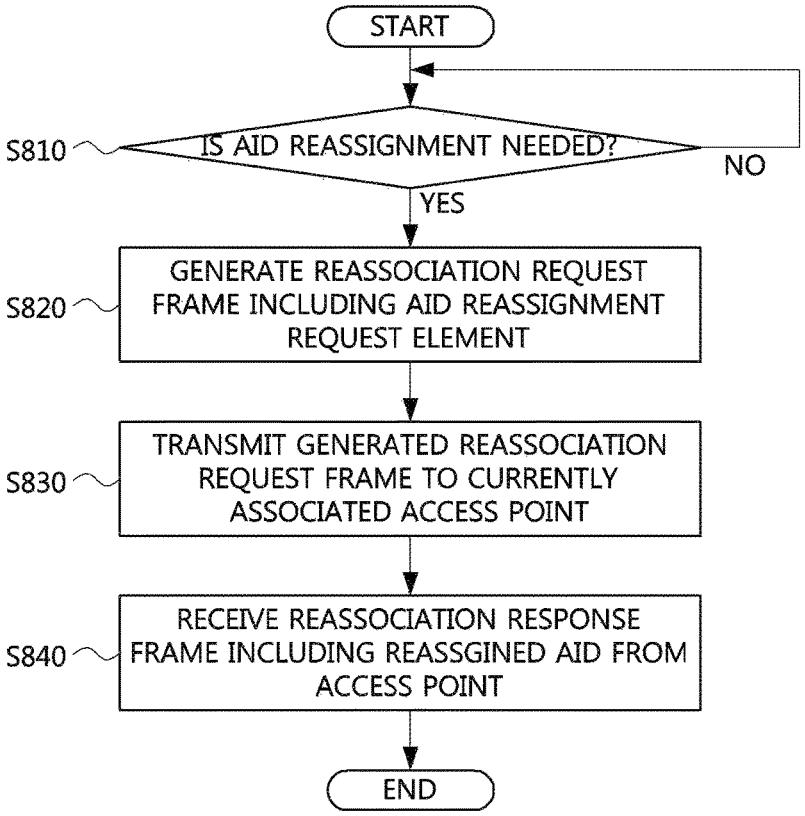
FIG. 8 is a flowchart showing a TIM reassignment method performed by a terminal according to an embodiment of the present invention.
FIG. 9 is a conceptual view showing a reassociation request frame structure according to an embodiment of the present invention.

FIG. 8 is a flowchart showing a TIM reassignment method performed by a terminal according to an embodiment of the present invention.

Referring to FIG. 8, the terminal 100 determines whether the AID reassignment is currently needed (S810).

Here, the terminal 100 may determine whether the AID reassignment is needed based on traffic pattern information, battery information, and service type information of the terminal 100. For example, when a transmission traffic amount is significantly reduced, or when a remaining battery life is less than a predetermined amount, the terminal determines that the AID reassignment is needed to wake up at longer intervals than before.

When it is determined through operation S810 that the AID reassignment is needed, the terminal 100 generates a reassociation request frame including an AID reassignment request element (S820).

Here, the terminal 100 generates a reassociation request frame including an AID reassignment request element. In addition, since the reassociation request frame is a frame that is transmitted to a currently associated AP, the reassociation request frame may include a capability field, a listen interval field, a current AP address field, a service set identifier (SSID) field, a supported rates field, and the AID reassignment request element.

In addition, the AID reassignment request element may include an element ID field, a length field, and an AID reassignment cause field. Here, the AID reassignment cause field may include service type change information, low power mode information, listen interval change information, traffic pattern change information, and remaining battery information.

In addition, the reassociation request frame may further include a service type element. As such, when the reassociation request frame further includes the service type element, the terminal 100 may add, to the service type element, a service type that is changed based on the service type change information of the terminal 100 included in the AID reassignment cause field.

The terminal 100 transmits the reassociation request frame generated through operation S820 to a currently associated AP (S830).

Subsequently, the terminal 100 receives, from the AP, a reassignment response frame including the reassigned AID as a response to the reassociation request frame that is transmitted through operation S830 (S840).

The above description of the AID reassignment method according to an embodiment of the present invention has exemplified the AID reassignment cause in a case in which the service type is changed, the terminal is changed to a low power mode according to a remaining batter situation, or the listen interval is needed to be changed. However, in another embodiment of the present invention, the AID reassignment cause is not limited as long as the gist of the present invention is not impaired.

The above-described reassociation request frame structure, an AID reassignment request element format, an AID reassignment cause field, and a service type element format will be described below with reference to FIGS. 9 to 12.

FIG. 9 is a conceptual view showing a reassociation request frame structure according to an embodiment of the present invention, FIG. 10 is a conceptual view showing an AID reassignment request element format according to an embodiment of the present invention, FIG. 11 is a conceptual view showing an AID reassignment cause field according to an embodiment of the present invention, and FIG. 12 is a conceptual view showing a service type element format according to an embodiment of the present invention.

Referring to FIG. 9, when it is determined that the reassignment of the AID of the terminal 100 is needed, the terminal 100 transmits a reassociation request frame to the currently associated AP 200.

Here, since the AP 200 is the currently associated AP 200, an extended supported rates element, a power capability element, a supported channels element, a robust security network (RSN) element, a quality of service (QoS) capability element, an RM enabled capabilities element, and a mobility domain element may be excluded from the existing reassociation request frame.

In addition, the reassociation request frame that is transmitted by the terminal 100 to the AP 200 may include a capability element, a listen interval element, a current AP address element, an SSID element, and a supported rates element, and may additionally include an AID reassignment request element and a service type element to request AID reassignment.

Referring to FIG. 10, the AID reassignment request element may include 1 octet element ID field, 1 octet length field, and 1 octet AID reassignment cause field.

In particular, as described in FIG. 11, the cause for requesting the AID reassignment may be represented in units of bits in the AID reassignment cause field.

Here, the AID reassignment cause field may include cases in which (1) a service type is changed, that is, a service type of an application layer is changed (for example, the change of the traffic pattern), (2) the terminal is changed to a low power mode according to a remaining battery life, and (3) the listen interval is needed to be changed. In addition, the AID reassignment cause field may additionally include any case when the AID is needed to be reassigned.

Referring to FIG. 12, when the service type is changed, an AID reassignment cause may add the changed service type to the service type element among the reassociation request frame shown in FIG. 9.

Here, the service type element may include an element ID, a length, and a service type.

Figure 13:
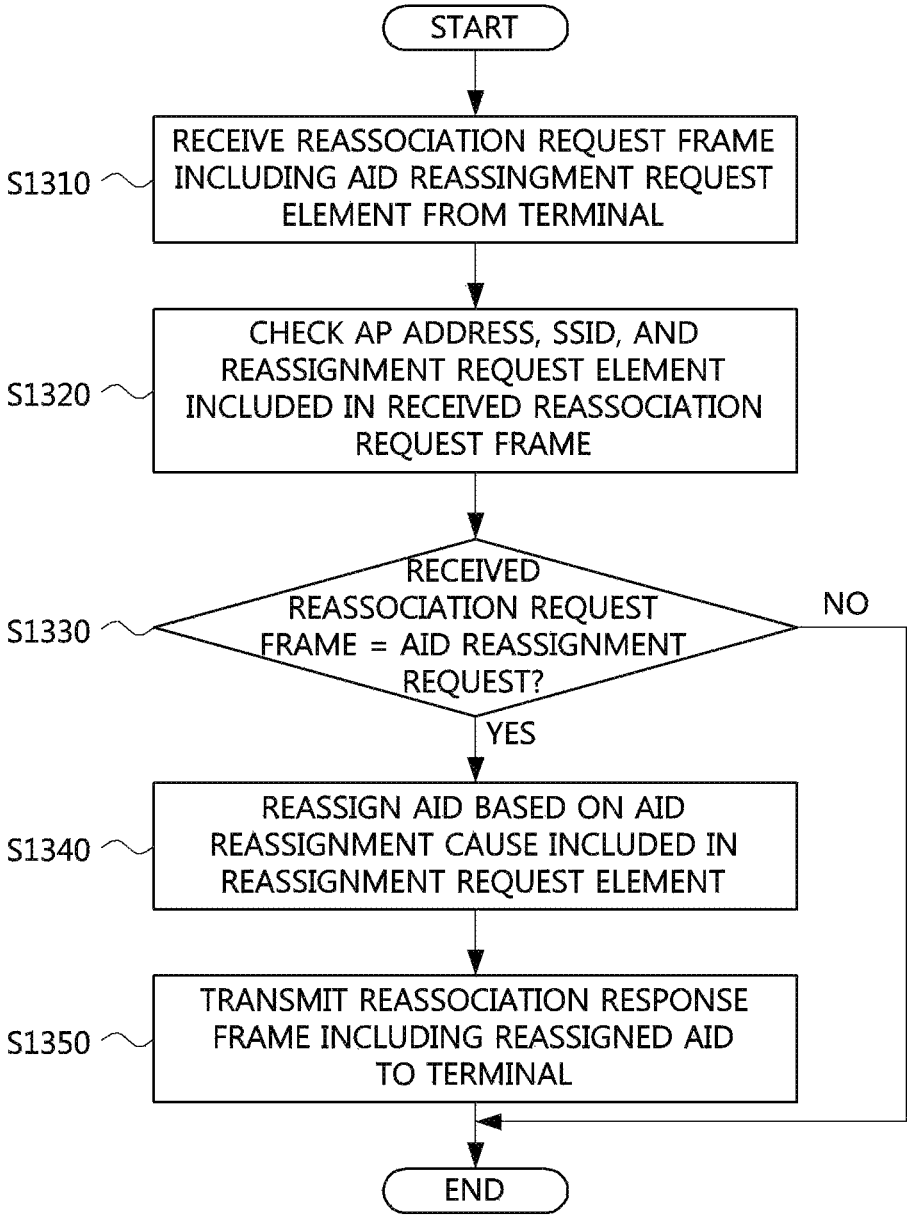
FIG. 13 is a flowchart showing a TIM reassignment method performed by an access point according to an embodiment of the present invention.

FIG. 13 is a flowchart showing a TIM reassignment method performed by an access point according to an embodiment of the present invention, and FIG. 14 is a conceptual view showing a reassignment response frame structure according to an embodiment of the present invention.

Referring to FIG. 13, the AP 200 receives a reassociation request frame including the AID reassignment request element from the terminal 100 (S1310).

Here, the AID reassignment request element may include an AID reassignment cause field that represents a cause for requesting the AID reassignment.

The AID reassignment cause field may include service type change information, low power mode information, listen interval change information, traffic pattern change information, and remaining battery information.

The AP 200 checks an AP address element, an SSID element, and an AID reassignment request element, which are included in the reassociation request frame received through operation S1310 (S1320) and determines whether the received reassociation request frame is checked to be an AID reassignment request (S1330).

Here, the AP 200 may check that the terminal 100 is the currently associated terminal through the check of the AP address and the SSID and may determine whether the reassociation request frame is an AID reassignment request through the check of the AID reassignment request element.

When the reassociation request frame received through operation S1330 is an AID reassignment request, the AP 200 reassigns an AID of the terminal 100 based on an AID assignment cause included in the AID reassignment request element (S1340).

Specifically, the AP 200 may reassign the AID such that the terminal 100 wakes up at every beacon when the AID assignment cause is that the amount of traffic of the terminal 100 increases. On the other hand, when the amount of traffic of the terminal 100 decreases, the AP 200 may reassign the AID such that the terminal 100 wakes up at longer intervals than before. Alternatively, when the remaining batter is almost empty, or when the listen interval is needed to be long, the AP 200 may reassign the AID such that the terminal 100 wakes up at longer intervals than before.

Here, the AP 200 may add the AID reassignment result to the reassignment response frame shown in FIG. [7] *14*. That is, the AP 200 may add a success or failure of the AID reassignment succeeds or fails to the status code, and may add the reassigned AID value to the AID field.

Subsequently, the AP 200 transmits, to the terminal 100, the reassociation response frame including the AID that is reassigned through operation S1340 (S1350).

In the AID reassignment method according to an embodiment of the present invention, it is possible to add some fields to the reassociation request frame and dynamically reassign the AID of the currently associated terminal to optimally operate a WLAN system.

Elements to be described below are elements defined not by physical properties but by functional properties. Thus, each element may be defined by its function. Each element may be implemented as hardware and/or a program code and a processing unit for performing its function. The functions of two or more elements may be implemented to be included in one element.

Accordingly, it should be noted that names of elements in an embodiment to be described below are not given to physically classify the elements but given to imply representative functions performed by the elements, and the technical spirit of the present invention is not limited by the names of the elements.

FIG. 15 is a view showing a configuration of a terminal that performs an AID reassignment method according to an embodiment of the present invention.

Referring to FIG. 15, the terminal 100 according to an embodiment of the present invention may include a transceiving unit 110 and a processing unit 120.

The transceiving unit 110 may perform communication with the AP 200 or another terminal based on a control of the processing unit 120.

The processing unit 120 determines whether the AID reassignment is needed.

Here, the processing unit 120 may determine whether the AID reassignment is needed based on the traffic pattern information, battery information, and service type information of the terminal 100.

In addition, when the AID reassignment is determined to be needed, the processing unit generates the reassociation request frame including the AID reassignment request element.

Specifically, the processing unit 120 generates a reassociation request frame including an AID reassignment request element.

Here, since the reassociation request frame is a frame that is transmitted to a currently associated AP 200, the reassociation request frame may include a capability field, a listen interval field, a current AP address field, a service set identifier (SSID) field, a supported rates field, and the AID reassignment request element.

In addition, the AID reassignment request element may include an AID reassignment cause field. Here, the AID reassignment cause field may include service type change information, low power mode information, listen interval change information, traffic pattern change information, and remaining battery information.

In addition, when the reassociation request frame includes the service type element, the processing unit 120 may add, to the service type element, to a service type that is changed based on the service type change information of the terminal 100 included in the AID reassignment cause field.

The processing unit 120 transmits a generated reassociation request frame to the currently associated AP 200 through the transceiving unit 110.

Furthermore, the processing unit 120 receives a reassociation response frame including the AID reassigned from the AP 200 through the transceiving unit 110. The above description of the terminal that performs the AID reassignment method according to an embodiment of the present invention has exemplified the AID reassignment cause in a case in which the service type is changed, the terminal is changed to a low power mode according to a remaining batter situation, or the listen interval is needed to be changed. However, in another embodiment of the present invention, the AID reassignment cause is not limited as long as the gist of the present invention is not impaired.

FIG. 16 is a view showing a configuration of a terminal that performs an AID reassignment method according to an embodiment of the present invention.

Referring to FIG. 16, the AP 200 according to an embodiment of the present invention may include a communication unit 210 and a processing unit 220.

The communication unit 210 may perform communication with nearby terminals based on a control of the processing unit 220.

The processing unit 220 receives the reassociation request frame including the AID reassignment request element from the terminal 100 through the communication unit 210.

Here, the AID reassignment request element may include an AID reassociation cause field that represents a cause to request the AID reassignment, and the AID reassignment cause field may include service type change information, low power mode information, listen interval change information, traffic pattern change information, and remaining battery information.

The processing unit 220 determines whether the received reassociation request frame is the AID reassignment request.

Here, the processing unit 220 may check that the terminal 100 is the currently associated terminal through the check of the AP address and the SSID and may determine whether the reassociation request frame is an AID reassignment request through the check of the AID reassignment request element.

When the received reassociation request frame is an AID reassignment request, the processing unit 220 reassigns an AID of the terminal 100 based on an AID assignment cause included in the AID reassignment request element and generates a reassociation response frame including the reassigned AID.

Here, the processing unit 220 may add a success or failure of the AID reassignment succeeds or fails to the status code among the reassociation response frame, and may add the reassigned AID value to the AID field.

In addition, the processing unit 220 transmits the reassociation response frame including the reassigned AID to the terminal 100 through the communication unit 210.

In the AP that performs the AID reassignment method according to an embodiment of the present invention, it is possible to add some fields to the reassociation request frame and dynamically reassign the AID of the currently associated terminal to optimally operate a WLAN system.

According to the AID reassignment method and the apparatus that performs the AID reassignment method according to an embodiment of the present invention may include generating a reassociation request frame by adding an AID reassociation request element when the reassignment of an AID to a terminal is needed, transmitting the generated reassociation request frame to a currently associated access point, and receiving a reassociation response frame including AID reassignment information from the access point.

Accordingly, the AID of the currently associated terminal may be dynamically reassigned according to a change in characteristics of the terminal to optimally operate a WLAN system.

While the example embodiments of the present invention and their advantages have been described in detail, it should be understood that various changes, substitutions and alterations may be made herein without departing from the scope of the invention.

What is claimed is:

[1. A method by a terminal for performing an association ID (AID) reassignment request, the method comprising:

establishing, by the terminal, an association with an access point, wherein an AID is assigned to a station by establishing the association;

generating, by the terminal to which a first AID has been assigned by the access point with which the terminal is currently associated, a request frame for an AID reassignment request;

transmitting the generated request frame to the access point with which the terminal is currently associated; and receiving a response frame including information on a second AID from the access point with which the terminal is currently associated, wherein the second AID different from the first AID is used as a new AID of the terminal, wherein the request frame includes first information indicating whether service type information is included in the request frame or not, and comprises service type information of the terminal according to the first information, and wherein the AID reassignment request is performed when a service type of the terminal being changed.]

[2. The method of claim 1, wherein the request frame includes an AID reassignment request element.]

[3. The method of claim 1, wherein the request frame includes second information indicating whether listen interval information is included in the request frame or not, and comprises listen interval information of the terminal according to the second information.]

[4. The method of claim 1, wherein the AID reassignment request is performed when a listen interval of the terminal being changed.]

[5. The method of claim 1, wherein the request frame is a reassociation request frame, and the response frame is a reassociation response frame.]

[6. The method of claim 1, wherein the request frame is an AID assignment request frame for AID change, and the response frame is an AID assignment response frame for AID change.]

[7. A method by an access point for performing an association ID (AID) reassignment, the method comprising:

establishing, by the access point, an association with a station, wherein an AID is assigned to the station by establishing the association;

receiving, from a terminal which is currently associated with the access point and a first AID having been assigned to the terminal by the access point, a request frame for AID reassignment request; and transmitting a response frame including information on a second AID to the terminal, wherein the second AID different from the first AID is used as a new AID of the terminal, wherein the request frame includes first information indicating whether service type information is included in the request frame or not, and comprises service type information of the terminal according to the first information, and wherein the AID reassignment request is performed when a service type of the terminal being changed.]

[8. The method of claim 7, wherein the request frame includes an AID reassignment request element.]

[9. The method of claim 7, wherein the request frame includes second information indicating whether listen interval information is included in the request frame or not, and comprises listen interval information of the terminal according to the second information.]

[10. The method of claim 7, wherein the AID reassignment request is performed when a listen interval of the terminal being changed.]

[11. The method of claim 7, wherein the request frame is a reassociation request frame, and the response frame is a reassociation response frame.]

[12. The method of claim 7, wherein the request frame is an AID assignment request frame for AID change, and the response frame is an AID assignment response frame for AID change.]

[13. A terminal for performing an association ID (AID) reassignment request, the terminal comprising:

a transceiver; and a processor;

wherein the processor is configured to:

establish, by the terminal, an association with an access point, wherein an AID is assigned to a station by establishing the association;

generate, when a first AID has been assigned to the terminal by the access point with which the terminal is currently associated, a request frame for an AID reassignment request;

transmit, using the transceiver, the generated request frame to the access point with which the terminal is currently associated; and receive, using the transceiver, a response frame including information on a second AID from the access point with which the terminal is currently associated, wherein the second AID different from the first AID is used as a new AID of the terminal, wherein the request frame includes first information indicating whether service type information is included in the request frame or not, and comprises service type information of the terminal according to the first information, and wherein the AID reassignment request is performed when a service type of the terminal being changed.]

[14. An access point for performing an association ID (AID) reassignment, the access point comprising:

a transceiver; and a processor;

wherein the processor is configured to:

establish, by the access point, an association with a station, wherein an AID is assigned to the station by establishing the association;

receive, using the transceiver, from a terminal which is currently associated with the access point and a first AID having been assigned to the terminal by the access point, a request frame for AID reassignment request; and transmit, using the transceiver, a response frame including information on a second AID to the terminal, wherein the second AID different from the first AID is used as a new AID of the terminal, wherein the request frame includes first information indicating whether service type information is included in the request frame or not, and comprises service type information of the terminal according to the first information, and wherein the AID reassignment request is performed when a service type of the terminal being changed.]

[15. The access point of claim 14, wherein the request frame includes an AID reassignment request element.]

[16. The access point of claim 14, wherein the request frame includes second information indicating whether listen interval information is included in the request frame or not, and comprises listen interval information of the terminal according to the second information.]

[17. The access point of claim 14, wherein the AID reassignment request is performed when a listen interval of the terminal being changed.]

[18. The access point of claim 14, wherein the request frame is a reassociation request frame, and the response frame is a reassociation response frame.]

[19. The access point of claim 14, wherein the request frame is an AID assignment request frame for AID change, and the response frame is an AID assignment response frame for AID change.]

*20. A method for use in a station (STA), the method comprising:*

*transmitting, to an access point (AP), an association request frame;*

*receiving, from the AP, an association response frame establishing the AP as a currently associated AP and including a first association identifier (AID);*

*transmitting, to the currently associated AP, a frame to request AID reassignment including an AID reassignment cause field including a listen interval change bit, and a service type change bit, wherein a service type is added to the frame based on the service type change bit; and*

*receiving, from the currently associated AP, a reassignment response including a second AID, the second AID being different than the first AID.*

*21. The method of claim 20, wherein the frame to request AID reassignment is a reassociation request frame, and wherein the reassignment response is a reassociation response frame.*

*22. The method of claim 20, wherein the service type indicates a new service type of the STA.*

*23. The method of claim 20, wherein the service type is included in a service type element.*

*24. The method of claim 20, wherein the transmitting, to the currently associated AP, the frame to request AID reassignment is based on a determination by the STA that a remaining battery life of the STA is changed.*

*25. The method of claim 20, wherein the transmitting, to the currently associated AP, the frame to request AID reassignment is based on a determination by the STA to change a listen interval of the STA.*

*26. A station (STA) comprising:*

*a transceiver; and*

*a processor;*

*wherein the processor is configured to transmit, via the transceiver, to an access point (AP), an association request frame,*

*the processor is configured to receive, via the transceiver, from the AP, an association response frame establishing the AP as a currently associated AP and including a first association identifier (AID),*

*the processor is configured to transmit, via the transceiver, to the currently associated AP, a frame to request AID reassignment including an AID reassignment cause field including a listen interval change bit, and a service type change bit, and wherein the processor is configured to add a service type to the frame based on a value of the service type change bit, and*

*the processor is configured to receive, via the transceiver, from the currently associated AP, a reassignment response including a second AID, the second AID being different than the first AID.*

*27. The STA of claim 26, wherein the frame to request AID reassignment is a reassociation request frame, and wherein the reassignment response is a reassociation response frame.*

*28. The STA of claim 26, wherein the service type indicates a new service type of the STA.*

*29. The STA of claim 26, wherein the service type is included in a service type element.*

*30. The STA of claim 26, wherein the processor is configured to transmit, to the currently associated AP, the frame to request AID reassignment based on a determination by the STA that a remaining battery life of the STA is changed.*

*31. The STA of claim 26, wherein the processor is configured to transmit, to the currently associated AP, the frame to request AID reassignment based on a determination by the STA to change a listen interval of the STA.*

*32. An access point (AP) comprising:*

*a processor; and*

*a transceiver,*

*wherein the processor is configured to receive, via the transceiver, from a station (STA), an association request frame,*

*the processor is configured to transmit, via the transceiver, to the STA, an association response frame including a first association identifier (AID),*

*the processor is configured to receive, via the transceiver, a frame to request AID reassignment including an AID reassignment cause field including a listen interval change bit, and a service type change bit, and a service type added to the frame based on a value of the service type change bit, and*

*the processor is configured to transmit, via the transceiver, to the STA, a reassignment response including a second AID, the second AID being different than the first AID.*

*33. The AP of claim 32, wherein the frame to request AID reassignment is a reassociation request frame, and wherein the reassignment response is a reassociation response frame.*

*34. The AP of claim 32, wherein the service type indicates a new service type of the STA.*

*35. The AP of claim 32, wherein the service type is included in a service type element.*

*36. The AP of claim 32, wherein the processor is configured to receive, from the STA, the frame to request AID reassignment based on a determination by the STA that a remaining battery life of the STA is changed.*

*37. The AP of claim 32, wherein the processor is configured to receive, from the STA, the frame to request AID reassignment based on a determination by the STA to change a listen interval of the STA.*

*38. A station (STA) comprising:*

*a transceiver; and*

*a processor,*

*wherein the processor is configured to transmit, via the transceiver, to an access point (AP), an association request frame,*

*the processor is configured to receive, via the transceiver, from the AP, an association response frame establishing the AP as a currently associated AP and including a first association identifier (AID),*

*the processor is configured to transmit, via the transceiver, to the currently associated AP, a frame to request AID reassignment including an AID reassignment cause field,*

*wherein the AID reassignment cause field includes a listen interval change bit and a service type change bit;*

*wherein the processor is configured to determine whether to transmit the frame to request AID reassignment including a listen interval or not;*

*wherein the processor is configured to determine whether to transmit the frame to request AID reassignment including a service type or not;*

*the processor is configured to receive, via the transceiver, from the currently associated AP, a reassignment response including a second AID, the second AID being different than the first AID.*

*39. The STA of claim 38, wherein the frame to request AID reassignment is a reassociation request frame, and wherein the reassignment response is a reassociation response frame.*

*40. The STA of claim 38, wherein the service type indicates a new service type of the STA.*

*41. The STA of claim 38, wherein the service type is included in a service type element.*

*42. The STA of claim 38, wherein the processor is configured to transmit, to the AP, the frame to request AID reassignment based on a determination by the STA that a remaining battery life of the STA is changed.*

*43. The STA of claim 38, wherein the processor is configured to transmit, to the AP, the frame to request AID reassignment based on a determination by the STA to change a listen interval of the STA.*

* * * * *